(No Model.)

O. STODDARD.
WINDMILL.

No. 320,190. Patented June 16, 1885.

WITNESSES:
Edward F. Mackintosh.
C. Sedgwick

INVENTOR:
O. Stoddard
BY Munn & Co
ATTORNEYS.

UNITED STATES PATENT OFFICE.

OREN STODDARD, OF BUSTI, NEW YORK.

WINDMILL.

SPECIFICATION forming part of Letters Patent No. 320,190, dated June 16, 1885.

Application filed March 12, 1884. (No model.)

*To all whom it may concern:*

Be it known that I, OREN STODDARD, of Busti, in the county of Chautauqua and State of New York, have invented a new and Improved Windmill, of which the following is a full, clear, and exact description.

My invention consists in the construction and arrangement of parts, as will be hereinafter fully described and claimed.

Reference is to be had to the accompanying drawings, forming part of this specification, in which similar letters of reference indicate corresponding parts in both the figures.

Figure 1:
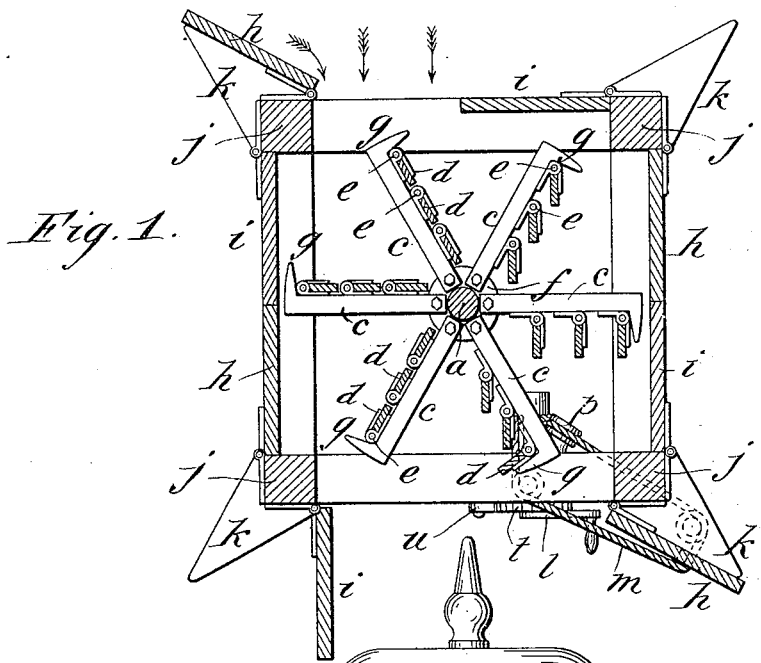
Figure 2:
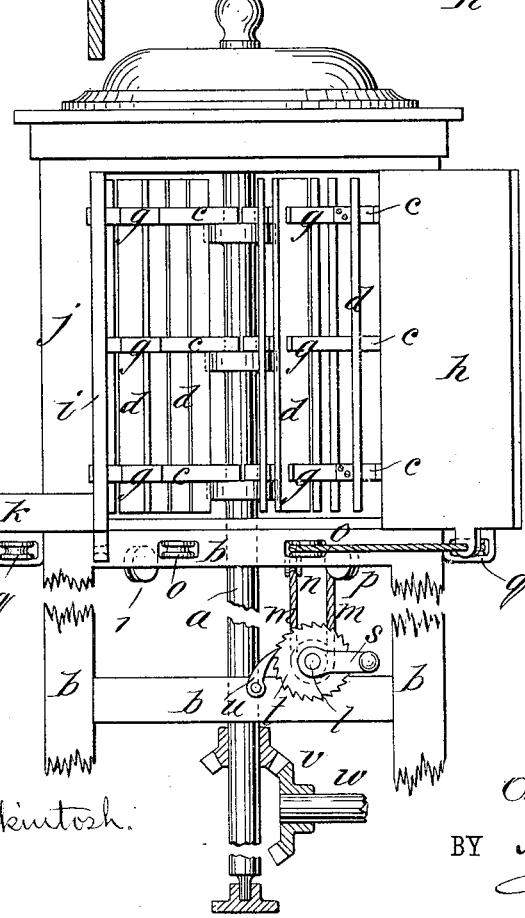

Figure 1 is a horizontal section of the wheel and the tower as I arrange them, and Fig. 2 is a side elevation with the doors of the tower open on the side from which the wind passes away.

On a strong vertical shaft, $a$, arranged in suitable bearings in the tower $b$, I arrange suitable strong radial and rigid arms, $c$, say, six in each circumferential set, and hang, say, three narrow vanes, $d$, pivoted thereon side by side, between the hub $f$ and the outer end of the arms by strap-hinges $e$, locating the hinges so that the vanes must swing toward the hub of the wheel to enable them to close flat against the arms of the wheel, and making a projection, $g$, on the outer end of each arm to prevent the outermost vane from swinging outward so far as to catch the wind that way. The straps of the hinges of the other vanes falling against the straps of the next outer vanes when the vanes may happen to swing outward prevent the vanes from closing on the arms that way, and insure the turning of the vanes toward the center of the wheel whenever they come to the position for taking the wind; but except when the wind is gusty and fitful the vanes will naturally swing inward and close properly on the arms by the effect of the wind on the returning side of the wheel, as clearly shown in Fig. 1. This form of wheel will run without any inclosing-tower whichever way the wind may blow; but it is necessary to close it in for shutting off the wind to stop it, and it is also desirable to close it in for protection from the weather, and also to conceal it from view when not in use; and, furthermore, it is desirable to shut off the wind from the returning side of the wheel to obtain the maximum effect of the wind, because the returning side of the wheel is more or less retarded by the wind when exposed to it. I therefore inclose the four sides of the wheel by two doors, $h$ and $i$, to each side, said doors being hinged to the corner-posts $j$ of the frame so as to meet in the middle of the space, in order that one may be open to allow the wind to take effect on the driving side of the wheel, and the other one may be closed to protect the returning side of the wheel from the wind, and both may be opened on the lee side of the wheel to afford more free escape of the wind than one can.

To each corner of the tower I fix strong stop rests, $k$, against which the doors may rest when open at a suitable angle to gather and deflect the wind onto the wheel with increased effect.

To enable the doors to be opened and closed from a position below, so as to avoid ascending to the tower, I connect each door with a revolving drum, $l$, by an endless cord, $m$, passing over suitable guide-pulleys, $n$, $o$, $p$, and $q$, so that said doors may be readily opened and closed, according as the drum is turned one way or the other by hand with a crank, $s$. The drums will be provided with a ratchet, $t$, and pawl $u$, to hold the doors open as desired. These endless cords will extend down to the base of the tower, or to any other preferred position. The power will be transmitted from the shaft $a$ by a pair of bevel-wheels, $v$, and a counter-shaft, $w$, or any other means.

It is designed to utilize the ornamental towers of buildings for locating wheels of this kind in them for supplying power for light machines, and only occasionally required, and wherein the wheels will be concealed, and only the ordinary form of the tower will appear when the doors are closed and the wheels are not in use.

Having thus described my invention, what I claim as new, and desire to secure by Letters Patent, is—

1. The inclosing-tower for a vertical wheel having vanes pivoted to the arms to swing edgewise to the wind on the returning side, having two doors for each side closing to the center plane of the wheel to enable one door to be opened on the driving side of the wheel, and the other door of the same side to be closed for the protection of the returning side of the wheel, and both doors to be opened on the lee side of the wheel, substantially as described.

2. The inclosing-tower for a vertical wheel having vanes pivoted to the arms to swing edgewise to the wind on the returning side, having two doors to each side for opening to the middle plane of the wheel, and also having the inclined stop-rests $k$, to hold the doors suitably to gather and deflect the wind on the wheel, substantially as described.

3. The combination of a cranked drum, $l$, endless cord $m$, and guide-rollers $n$, $o$, $p$, and $q$, with the door of an inclosing-tower of a wind-wheel, said cranked drum, cord, and guide-rollers being arranged to enable the door to be opened from the base of the tower, and said drum being provided with a ratchet and pawl to hold the door open, substantially as described.

OREN STODDARD.

Witnesses:
GEORGE D. COBB,
FRANK C. SIMMONS.